March 5, 1963
J. L. KLEINMAN
3,080,493
MOTOR STRUCTURE HAVING MOVABLE CONNECTING ELEMENTS
Filed Nov. 25, 1958
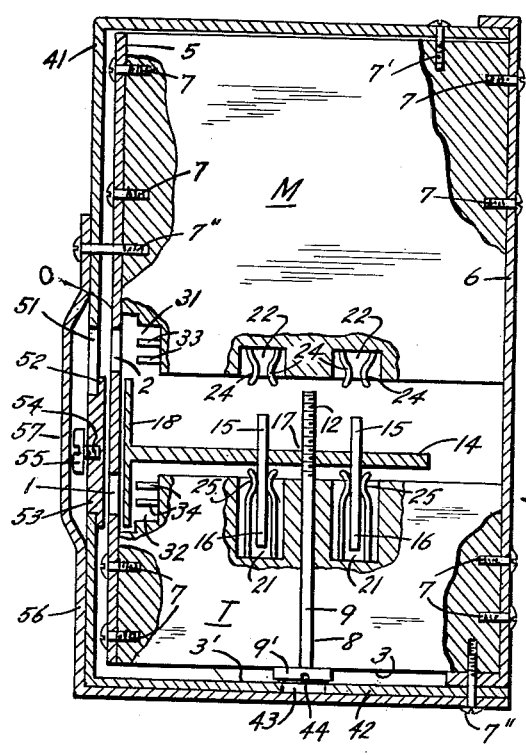
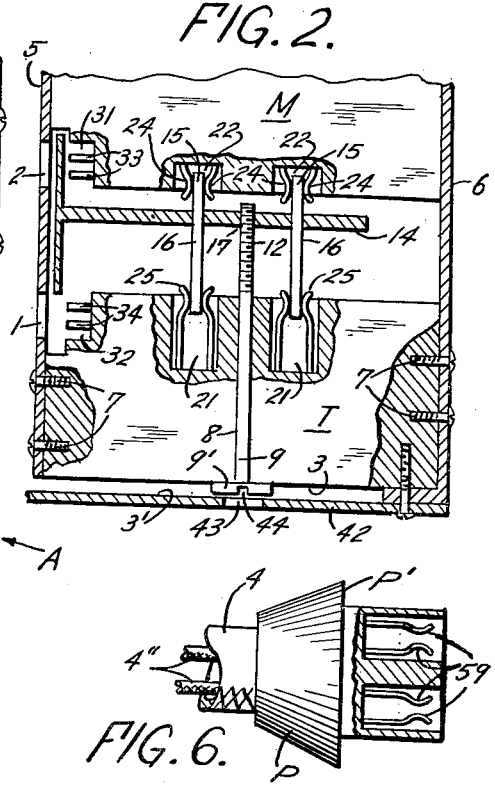
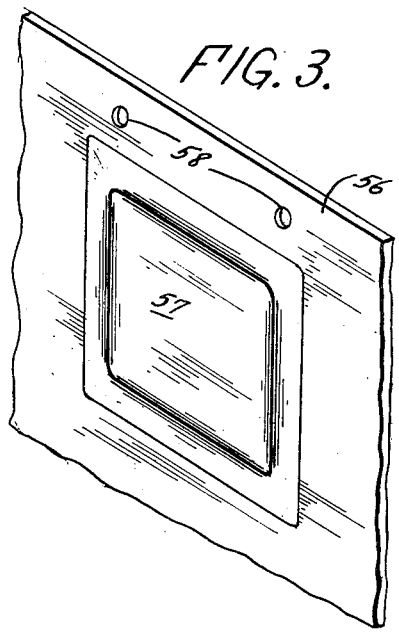
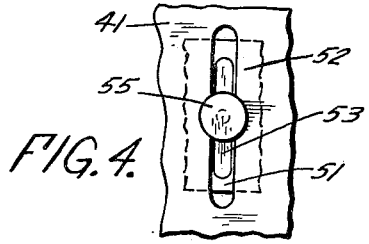
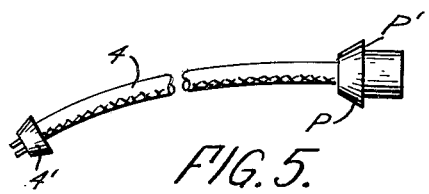
INVENTOR.
Jacob L. Kleinman

United States Patent Office 3,080,493
Patented Mar. 5, 1963

3,080,493
MOTOR STRUCTURE HAVING MOVABLE CONNECTING ELEMENTS
Jacob L. Kleinman, % A. Lackenbach, 40 Exchange Place, New York 5, N.Y.
Filed Nov. 25, 1958, Ser. No. 776,263
7 Claims. (Cl. 310—68)

This invention relates to an adjustable motor structure of a type adaptable for use in connection with electric voltage supply of different values or volume, thus being readily applicable for use in various cities, States or countries, and wherein the structure will retain its set position without danger of accidentally changing such set position.

My novel construction is capable of being utilized in connection with various electrically operated implements; for example, radio structures, television machines, electric shavers, washing machines, drying machines, lamps, refrigerating machines, etc. or any combination of the above mentioned implements.

In accordance with my invention, I produce a motor structure comprising a hollow casing having an electrically operated motor secured therein, and in addition thereto I also inclose therein an electrical transformer secured in a position somewhat spaced away from such motor, either the motor or transformer may be provided with movable connecting elements for connecting such transformer to such motor for changing the value or volume of electric voltage supply or power, and also with means for operating such elements in a manner whereby such elements will not, accidentally, change a set position.

To illustrate the ordinary commercial utility of my novel motor structure in daily life, a motor assembly constructed in accordance with my invention, of whatever style or type it may be made, could be utilized to great advantage; the fact that in my structure the motor and the transformer are each provided with a set of connecting prongs for connection with a cable-cord, and with openings facing such prongs and with means for covering the particular set of prongs not being used; and also the fact that the connection between my motor and transformer is accomplished by movable prongs which can easily be connected or disconnected; and, furthermore, the fact that the means for operating the connectable elements are located entirely within the casing and can be operated by a removable tool will prevent accidental conversion of such means thereby assuring stationary location of the elements or parts in my structure holding same in desired position; and the fact that such connection or disconnection can easily be accomplished by any one without resorting to service stations, will greatly popularize my invention to an extent whereby it may prove quite valuable commercially.

From the above it is evident that my present invention teaches an entirely new form of structure in the art of making assembled motor structures; it can be utilized to great advantage, it can be easily adjusted to suit the particular requirements at various occasions, it can be easily operated with positive assurance of proper and safe functioning as may be needed.

For a fuller understanding of the nature and objects of the invention reference is had to the following detailed description together with the accompanying drawing, in which:

FIG. 1 is a view, partly in cross-section, showing my combined motor and transformer structure in a position disconnected from each other;

FIG. 2 is a view of the same structure as in FIG. 1, showing the transformer and motor connected to each other;

FIG. 3 is a perspective view showing a portion of the outer cover of my structure;

FIG. 4 is a top view, partly broken away, of my movable cover;

FIG. 5 is a view of a cable-cord; and

FIG. 6 is an enlarged view of the plug of the cable-cord for connection with either one of the two sets of prongs.

I am showing the figures herein for illustrative purposes, for a better understanding of my invention, to be able to properly describe the herein invention, and not for limitation purposes.

Referring more particularly to the drawing, in which similar reference characters identify similar parts in the several views, in my novel combined motor structure.

Arrow A indicates my assembled motor structure. M indicates the motor and T indicates the transformer. The motor and transformer are of conventional type or structure and will therefore not be described herein. The invention herein is primarily in the location of the separate motor and separate transformer with respect to each other and the means of movable connection therebetween and the two separate sets of prongs for connection with the cable-cord and the means for covering and uncovering the individual set of prongs.

The motor M and the transformer T are each secured (in spaced relation with respect to each other) to base portions 5 and 6 by suitable means, for example, screw members or rivets 7.

The transformer T is provided with an opening 8 having a screw-element 9 positioned therein. The portion of the screw-element 9 which is positioned within the opening 8 of the transformer is not provided with a screw-thread and may therefore be rotated into either direction, whereas the outwardly extending end portion 12 of such screw-element 9 is provided with a screw-thread 12 for a purpose which will be hereinafter explained.

A member 14, provided with a plurality of sets of prongs 15 and 16 and with a screw-threaded opening 17 and with a head portion 18, is positioned within the spaced section between the motor M and the transformer T for a purpose which will be hereinafter explained.

The front portions of the motor M and of the transformer T (which face each other) are each provided with recessed portions 21 and 22. Each of these recessed portions are provided with yieldable or spring-sockets 24 and 25.

The motor M and the transformer T are each provided, at suitable locations, with recessed portions 31 and 32. The recessed portion 31 is provided with a set of prongs 33 and the recessed portion 32 is provided with a set of prongs 34; the base portion 5 is provided with openings 1 and 2 facing the individual sets of prongs 33 and 34 for a purpose which will be hereinafter explained.

*Assembling of structure.*—The member 14 is placed within the spaced section between the motor M and the transformer T, having its head portion 18 located under the base portion 5; the screw element 9 is then placed into the opening 8 and moved forwardly until its head portion 9' reaches the surface 3 of such transformer. The cover 41 is then placed into position and secured to the structure by suitable means, for example, screw-members 7'. The portion 42 of the cover 41 is overlying part of the head portion 9' of the element 9, holding the head portion 9' between the surface 3 and the wall portion 42 thereby preventing longitudinal movements of such element 9; such wall portion 42 is provided with an opening 43, facing the head portion 9' but smaller in size than that of such head portion 9', thereby enabling application of a tool or screw-driver within the slot 44 of such head portion 9' to rotate the element 9 into either direction.

From the above it is clear that the element 9 can not be moved longitudinally thereof; the head portion 9' located between the outer face 3 of the transformer T and the inner face 3' of the wall portion 42 will positively prevent such longitudinal movements; such element 9 can therefore only be rotated within the opening 8 of the transformer, so that while rotating such element 9 into desired direction the member 14 will be moved forwardly, upon the screw-threaded portion 12, into a position whereby the prongs 15 will engage the spring portions 24 of the sockets forming a part of the motor M, and simultaneously therewith move the head portion 18 into a position covering the set of prongs 33 and the opening 2 thereby blocking the connection of a cable-cord plug P with such set of prongs; at the same time uncovering the opening 1 and the set of prongs 34 holding same in readiness for connection with the plug P of a cable-cord 47. Rotating the element 9 into the opposite direction will cause the member 14 to move backwardly thereby removing the prongs 15 from the socket portions 24 and uncovering the opening 2 and the set of prongs 33 for engagement with the plug P, and simultaneously therewith covering the opening 1 and the set of prongs 34 preventing plug connection therewith.

The following is therefore clear: If the motor M is constructed for use in connection with the electric-current as used, for example, in the United States of America, then the member 14 would be located in a position as illustrated in FIG. 1; wherein the prongs or pins 15 are separated from the socket portions 24, and the opening 2 and the set of prongs 33 are uncovered and in readiness for connection with the plug P, and the opening 1 and the set of prongs 34 are covered in a manner preventing connection of a plug therewith. However, if the implement containing my herein disclosed motor structure is brought into Great Britain, where the electric-current or voltage supply used is of a different value or volume, then all the user has to do is to place a screw-driver through the opening 43 into the slot 44 and rotate the element 9 into desired direction moving the member 14 forwardly bringing the pins or prongs 15 into engagement with the socket portions 24, and simultaneously therewith causing the head portion 18 to cover the opening 2 and the set of prongs 33, while at the same time uncovering the opening 1 and the set of prongs 34 holding same in readiness for connection with the plug P to thereby adjust the electric voltage supply into the proper current for use with the implement.

The fact that in my structure the rotatable element 9, including its head portion 9' (the only portion that can be utilized to operate the structure), is located entirely within the assembled structure, in a manner whereby no portion thereof is exposed on the outside of the implement, assures positive stationary adjustment of structure, so that such adjustment will not by itself move out of adjusted position, thereby preventing accidental damage to the structure.

The wall portion 41 is provided with an opening or slot 51 to receive plate member 53 positioned therein in a slidable manner. This slidable member 53 is provided with extending portions 52 adapted to be positioned underneath the under face of the wall portion 41; a screw-member 54 is associated with the portion 53; such member 54 is provided with an enlarged head portion 55 of a size larger than the width of the slot 51, so that by rotating the screw-member 54 into desired direction the head portion 55 will urge such plate portions 52 towards the inner face of the wall portion 41 and hold same tightly secured in selected position thereby preventing accidental movements of the plate member 53; whereas, rotating such screw-member 54 into opposite direction will loosen the grip thereof and permit slidable movements of the plate member 53 within the slot 51 in either direction. Such slidable plate member 53 may thus be utilized to cover either one of the openings 1 or 2.

My structure is provided with a cover-section 56 for covering the openings of the structure before being installed into an implement. Such cover-section is provided with a cup-shaped portion 57, for overlying the head portion 55, and with openings 58 for being secured to the structure by screw-sections 7", thereby preventing the entrance of foreign elements thereinto.

The cable-cord 4 comprises the usual wire portions 4"' and is provided with the usual plug 4' for connection to a source of power, and with a plug P for connection with either one of sets of prongs 33 or 34; the socket portions 59 of the plug P are similar in structure to those of 24 or 25.

The plug P is provided with a shoulder portion P' for engaging the outer face O of the base portion 5 thus covering the opening 2 (or 1) when the section containing the socket portions 59 is placed into position for interlocking with the set of prong portions 33 (or 34), thereby protecting such connection.

I desire it to be understood that the disclosures herein are for illustrative purposes only and not for limitation purposes.

From the above it will be seen, that I have invented and perfected a motor assembling structure of a new and unique combination and design, a structure which is practical and useful, economical to be manufactured and therefore of commercial value, and although I have shown certain preferred forms or illustrations in order to describe and explain the novelty of my invention, yet, by showing such structure, I do not, by any means limit myself to these structures, nor to the terms used in describing same, as they are for illustrative purposes only. Various suggestions and changes of structure may be resorted to, and I desire it to be understood that I have same in mind when showing and describing this invention, and seek protection by Letters Patent. And although I have mentioned in describing this invention of what material certain parts may be made, how they may be formed, shaped or styled, and how they may be assembled, yet, I desire it to be understood, that this structure, or part thereof, may be made of any suitable material; shaped, formed, styled or arranged in any suitable manner, and assembled in any suitable or convenient way, so that the parts may be easily taken apart, removed, cleaned, replaced and/or reassembled, and that various changes in detail may be resorted to without departing from the spirit of this invention.

I claim:

1. A motor assembly comprising a wall portion having secured thereto a separate motor and a separate transformer, said motor and the said transformer located in spaced apart relation with respect to each other, a movable member located between the said motor and the said transformer, a rotatable element carried by the said transformer, said rotatable element connected with the said movable member in a rotatable manner, said movable member connected with the said transformer, the said rotatable element adapted to be rotated into desired direction for causing the said movable member to move towards the said motor and become connected therewith uniting the said motor and the said movable member and the said transformer into a unitary structure, said rotatable element adapted to be rotated into the opposite direction for causing the said movable member to move and become disconnected from the said motor for separating such motor from the said transformer.

2. A motor assembly comprising a wall portion having secured thereto a separate motor and a separate transformer, said motor and said transformer located in such secured position in spaced relation with respect to each other, said transformer having an opening, a rotatable element having a screw-threaded end portion, said rotatable element positioned within the said opening of the said transformer, a movable member having a screw-threaded opening and a plurality of separate sets of prongs, said movable member positioned between the said motor and the said transformer, the said screw-threaded end portion of the said rotatable element positioned within the said screw-threaded opening of the said movable member, one of said sets of prongs connected to the said transformer, said rotatable element adapted to be rotated into desired direction causing the said screw-threaded end portion to move towards the said motor for having one of the said sets of prongs connected with such motor, forming a unitary structure of such motor and the said transformer, said rotatable element adapted to be rotated into the opposite direction causing the said screw-threaded end portion to withdraw the said movable member disconnecting the said set of prongs from the said motor for separating such motor from the said transformer.

3. A motor assembly comprising a wall portion carrying a separate motor and a separate transformer, said motor and transformer located in spaced relation with respect to each other, said motor and the said transformer each provided with a pair of sockets, said transformer having an opening, a rotatable element having a screw-threaded end portion positioned within the said opening, a movable member having two individual sets of prongs, said movable member positioned between the said motor and the said transformer, said member having a screw-threaded opening for receiving therein the said screw-threaded end portion of the said rotatable element, one of said sets of prongs connected with the set of sockets of the said transformer, the said rotatable element adapted to be rotated into desired direction for causing the said screw-threaded end portion to move the said movable member towards the said motor to have the other set of the said sets of prongs engaging the set of sockets of the said motor thereby uniting the said motor with the said transformer and with the said movable member into a unitary structure, the said rotatable element adapted to be rotated into the opposite direction withdrawing the said movable member from the said motor disconnecting the said prongs from the sockets of the said motor for separating the said transformer from the said motor.

4. A motor assembly comprising a wall portion having secured thereto a separate individual motor and a separate individual transformer, said motor and said transformer located in spaced relation with respect to each other, the said motor and the said transformer each provided with a set of sockets and with a set of prongs, the sets of sockets adapted to face each other, the sets of prongs adapted to face the said wall portion, the said wall portion provided with two openings each facing one of the sets of prongs, a cable-cord having a socket-plug and a connectable-plug, said socket-plug adapted to be positioned within one of the said openings and engageable with the set of prongs of the said motor, the connectable-plug adapted to be secured to a source of power for operating the said motor, said socket-plug adapted to be removed from the said motor prongs, a movable element having a screw-threaded opening and two oppositely disposed sets of prongs, said movable element located between the said motor and the said transformer, one set of prongs of the said two sets located within the sockets of the said transformer, a rotatable element having a screw-threaded end portion, said rotatable element positioned within the opening of the said transformer having the said screw-threaded end portion positioned in a rotatable manner within the screw-threaded opening of the said movable member, said rotatable element adapted to be rotated in the desired direction to have the said screw-threaded end portion move the said movable member towards the motor to have the other set of said two sets of prongs positioned within the sets of sockets of the said motor, a movable cover-plate, said cover-plate adapted to cover the set of prongs of said motor and the said opening facing such set of prongs, and uncovering the set of prongs of the said transformer and the opening facing such prongs, the said socket-plug adapted to be connected to the said transformer prongs simultaneously therewith changing the volume of the said source of power to be transmitted into the said motor, said socket-plug adapted to be removed from the said sets of prongs.

5. A motor assembly comprising a wall portion having secured thereto a separate motor and a separate transformer, said motor and said transformer located in spaced relation with respect to each other, the said motor and the said transformer each having a recessed section, each of said recessed sections having a socket structure therein, the said motor and the said transformer each having a set of prongs located in a manner facing the said wall portion, the said wall portion having two openings each facing one set of the said two sets of prongs, said sets of prongs each adapted to have a cable-cord plug connected therewith, said transformer having an opening, a rotatable element having a screw-threaded end portion, a movable member having a screw-threaded opening and oppositely disposed sets of prongs and a plate-portion, said movable member having one of its sets of prongs positioned within the socket structure of the said transformer and its plate-portion positioned between one of the said openings of the said wall portion and its facing set of prongs of the said transformer, said rotatable elements positioned within the said opening of the said transformer having its screw-threaded end portion positioned in a rotatable manner within the said opening of the movable member, said rotatable element adapted to be rotated into desired direction having its screw-threaded end portion move the said movable member towards the said motor for having the other of its sets of prongs engage and become located within the socket structure of the said motor, and simultaneously therewith having its plate-portion moved away from its position uncovering the said covered set of prongs and said opening and place itself between the set of prongs of the said motor and its facing opening, said movable member adapted to be moved into either direction for becoming connected with the said motor and for becoming disconnected therefrom.

6. A motor assembly comprising a wall portion having secured thereto a separate motor and a separate transformer in spaced relation with respect to each other, said motor and the said transformer each having a set of prongs for individual connection with a cable-cord plug, the said wall portion having individual openings each located in alignment with one of the said set of prongs, a movable cover-plate for overlying and covering and also for uncovering either one of the said openings of the said wall portions, and means for connecting the said motor with the said transformer and also to sever such connection for separating the said motor from the said transformer.

7. A motor assembly comprising a wall portion having secured thereto a separate motor and a separate transformer, said motor and said transformer located in spaced relation with respect to each other, a casing for the said motor assembly, movable means within the said casing for connecting the said motor to the said transformer, rotatable means within the said casing for operating the said movable means, the said casing having an opening located opposite the said rotatable means for receiving a removable tool therethrough to engage the said rotatable means for rotatable purposes, and means for preventing longitudinal movements of said rotatable means.

References Cited in the file of this patent

UNITED STATES PATENTS

| | | |
|---|---|---|
| 1,433,725 | Jennings | Oct. 13, 1922 |
| 2,158,145 | Oster | May 16, 1939 |
| 2,176,119 | Brown | Oct. 17, 1939 |
| 2,186,578 | Doughman | Jan. 9, 1940 |
| 2,228,665 | Knopp | Jan. 14, 1941 |
| 2,512,407 | Wood | June 20, 1950 |
| 2,516,184 | Christie | July 25, 1950 |
| 2,792,544 | Morrill | May 14, 1957 |

FOREIGN PATENTS

| | | |
|---|---|---|
| 310,910 | Italy | Sept. 13, 1933 |
| 388,604 | Great Britain | Mar. 2, 1933 |
| 684,961 | Germany | Dec. 8, 1939 |
| 736,789 | Great Britain | Sept. 14, 1955 |